May 27, 1941.  P. W. THORNHILL  2,243,782

SHOCK ABSORBER

Filed Nov. 9, 1940

INVENTOR
Peter W. Thornhill
BY Stevens and Davis
ATTORNEYS

Patented May 27, 1941

2,243,782

UNITED STATES PATENT OFFICE 2,243,782

SHOCK ABSORBER

Peter Warborn Thornhill, London, England, assignor of one-half to The Ribbesford Company Limited, London, England Application November 9, 1940, Serial No. 365,116
In Great Britain October 2, 1939

9 Claims. (Cl. 267—64)

This invention relates to shock absorbers of the type in which liquid is used for damping relative movement of a pair of members, usually a cylinder and a plunger telescopically mounted therein, resilient means such as a quantity of compressed gas and/or one or more springs being provided to sustain the load which is normally carried by the shock absorber due to the weight of the vehicle or equivalent upon which the shock absorber is installed.

It is the object of the present invention to provide improvements in such shock absorbers whereby they may be rendered more efficient.

In a shock absorber having a variable volume working space which is filled with liquid and which communicates by way of a damping valve device with a chamber arranged so that liquid entering it causes energy to be stored in resilient means, thereby placing the liquid under sufficient pressure to support the normal static load on the shock absorber, the present invention is characterised by the fact that the damping valve device comprises a pair of non-return valves arranged to act in opposition, either one of said non-return valves being adapted to be held open by controlling means which are operated by the pressure of the liquid in the variable volume working space.

According to a feature of the invention there is provided a shock absorber having a variable volume working space which is filled with liquid and which communicates by way of a damping valve device with a chamber arranged so that liquid entering it causes energy to be stored in resilient means, thereby placing the liquid under sufficient pressure to support the normal static load on the shock absorber, characterised by the fact that the damping valve device comprises a pair of non-return valves arranged to act in opposition, either one of said non-return valves being adapted to be held open by controlling means which are responsive to the pressure of the liquid in the variable volume working space, and are operated thereby in one direction or the other depending upon whether the liquid pressure in the variable volume working space is greater or less than the pressure required to support the static load.

Preferably the controlling means acts in conjunction with the non-return valves so that only when the pressure in the variable volume working space rises above the pressure corresponding to the static load on the shock absorber, and at the same time above the pressure in the chamber, is said liquid permitted to escape to the chamber. Said controlling means can conveniently be arranged to act in conjunction with the non-return valves so that only when the pressure in the variable volume working space falls below the pressure corresponding to the static load on the shock absorber, and at the same time below the pressure in the chamber, is said liquid permitted to pass from the chamber to the variable volume working space.

Further according to the invention a shock absorber is provided comprising telescopically slidable cylinder and plunger tubes, each closed at its outer end, a piston head on the plunger tube separating a variable volume working space within the cylinder from the interior of the plunger, resilient means within said plunger, and liquid filling the whole of the said working space and communicating by way of a damping valve device with the space within the plunger, so that the liquid therein coacts with the resilient means to store energy in the latter, characterised by the fact that the damping valve device comprises a pair of non-return valves arranged in opposition, and controlling means which are actuated by the liquid pressure in the cylinder working space, depending upon whether said liquid pressure exceeds or is less than a predetermined value, thereby forcing one of the non-return valves open and allowing liquid to open and pass through the other of said non-return valves.

The said predetermined pressure may correspond substantially to that required to support the normal static load on the shock absorber and may be determined by the adjustment of a spring acting upon the controlling means. The controlling means may comprise a piston valve member having a cylindrical portion sliding in a bore, a stem which extends along a passageway connecting the variable volume working space with the chamber (or the interior of the plunger), and which is formed with a radial flange located between a pair of annular valve members slidable in said passageway, and an inwardly projecting abutment for the annular valve members provided within said passageway at a position between said valve members, the cylindrical portion having that end surface nearer the stem acted upon by the pressure of the liquid in the shock absorber, while said cylindrical portion is urged resiliently in the opposite direction by a force corresponding to the static load on the shock absorber. That part of the stem between the cylindrical portion of the piston valve member and the radial flange may be exposed to liquid pressure in the plunger, the diameter of the end surface of said cylindrical portion being equal to the diameter of the centrol aperture through each of the annular valve members, each of which latter, if desired, may be urged into engagement with the radial flange by means of a coiled compression spring.

In one arrangement that end surface of the cylindrical portion remote from the stem is in communication with the atmosphere and is urged inwards by a coiled compression spring adapted to overcome the liquid pressure in the shock absorber when the latter is in equilibrium, bearing its normal static load.

In a shock absorber in which resilient means for extending the shock absorber comprise a quantity of compressed gas disposed within the plunger, said gas being separated from the liquid by a floating piston within said plunger, the floating piston may be provided with a non-return valve adapted to permit the liquid to pass into the gas space when the shock absorber is being charged with liquid, and to escape through the usual air inlet valve or equivalent. The air inlet valve or equivalent may communicate with a tube extending downwards into the space for compressed gas, the length of said tube determining the volume of liquid retained within the shock absorber.

The invention is described by way of example in the accompanying drawing, in which.

Figure 1:
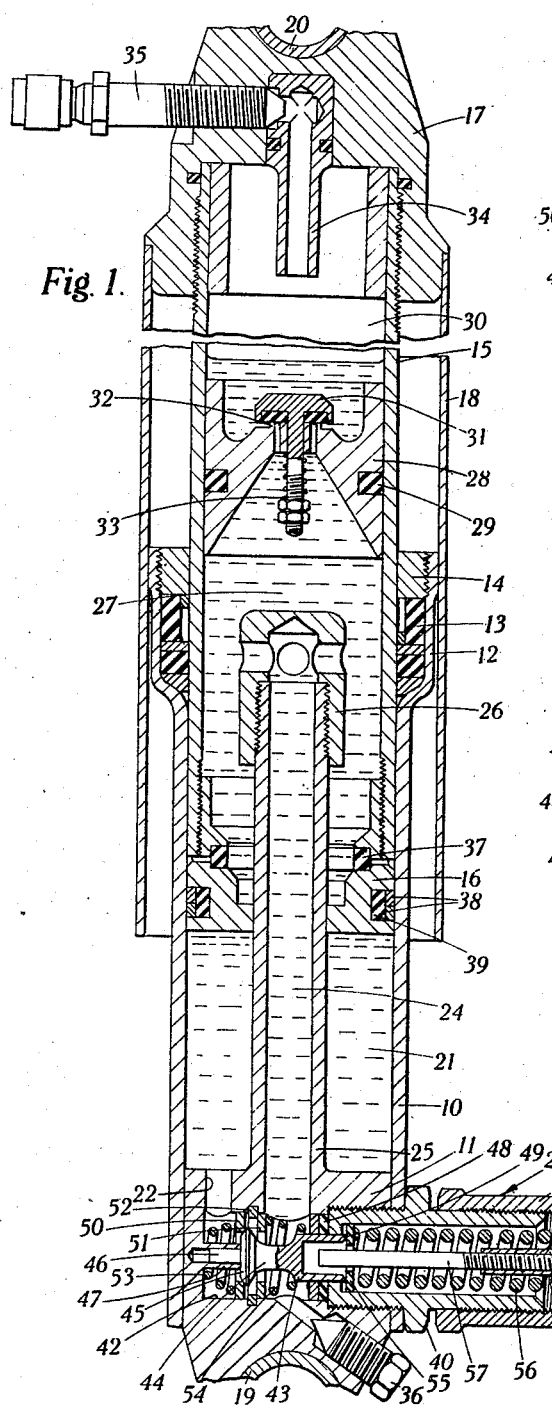
Figure 1 is a sectional elevation of one form of shock absorber.

The shock absorber shown in the drawing is intended primarily for use on motor cars, tanks, and other land vehicles, but of course the principles involved can be applied equally well to shock absorbers or struts for use in the undercarriages, tail wheels and nose wheels of aircraft. In each case the shock absorber or strut is arranged so that shortening of a pair of telescopic members, as would normally be caused by applying the usual load to the shock absorber, causes energy to be stored in a resilient medium, which latter, after a predetermined amount of movement has occurred, is capable of supporting the whole load on the shock absorber. In other words, the shock absorber comprises springing means as well as means for damping relative movement of the shock absorber elements.

Thus, in the drawing, one of these elements comprises a tubular cylinder 10, which is closed at its lower end by a plug 11 and is enlarged in diameter at 12 to accommodate a packing assembly, which is indicated generally at 13, this being held in position by a nut 14. The other element takes the form of a tubular plunger 15, which is slidable in a liquid-tight manner through the packing 13 and has its inner end closed by a piston head 16, the opposite end of said plunger tube 15 being closed by a cap 17 serving to carry a tubular shield 18 for protecting from dust, dirt and other foreign matter the outer sliding surface of said plunger tube 15. The plug 11 and cap 17 are shaped to form fixing lugs, which are shown partly broken away in Figure 1 and which are provided with tubular bearing bushes 19 and 20 respectively to engage with transverse pins (not shown) carried by the two parts of the vehicle or equivalent requiring to move relatively, for example the axle mounting and the chassis-frame in the case of a motor vehicle.

The working space 21 within the cylinder 10 is always completely full of damping liquid, such as oil, which communicates by way of a passage 22 and a damping valve device indicated at 23 with the interior 24 of a stem 25, which latter leads through the piston head 16 and has a perforated cap fitting 26 adapted to allow liquid to flow from the stem 25 into a working space 27 disposed within the plunger tube 15. A floating piston 28 having a packing ring 29 is freely slidable within said plunger tube and normally serves as a partition separating the main body of liquid in the space 27 from a quantity of compressed air or other gas disposed within a space 30 in the upper part of said plunger tube. The floating piston 28 is fitted with a non-return valve 31 of the mushroom type, which valve is normally held down on its seating 32 by a coiled compression spring 33. This valve is used to ensure that the working spaces 21 and 27 are completely filled with liquid when the shock absorber is being charged, and for this purpose the cap 17 at the upper end of the plunger tube 15 is provided with a downwardly extending tube 34 connected with an air inlet valve or equivalent device 35. The plug 11 at the bottom of the cylinder is fitted with an inlet connection 36 for oil or equivalent damping liquid, which latter is injected while the shock absorber is in its fully contracted condition, the air valve 35 being open in the meantime. As a result the ingoing liquid, after filling the working spaces 21 and 27, forces the floating piston 28 as far as possible in an upward direction and then the valve 31 opens, permitting the liquid to flow into the space 30 until said liquid reaches the level of the bottom of the tube 34. The liquid then flows freely out of the air valve 35, carrying with it any air bubbles, and the proper volume of liquid is thus inserted into the shock absorber, as determined by the length of the tube 34. When the inlet connection 36 is closed, air is pumped in through the valve 35 until the interior of the shock absorber is at a pressure sufficient to carry in a resilient manner the normal static load on the shock absorber.

The piston head 16 is grooved circumferentially to accommodate an obstructor device comprising a pair of split metal rings 38 which are arranged side by side and are urged outwards into contact with the cylinder 10 by a rubber ring 39, thus, in effect, considerably retarding the flow of liquid past the outside of the piston head 16 without actually forming an efficient seal. The piston head 16 is also fitted with a rubber ring 37, which is adapted to act as a non-return valve, the main object of this being to avoid undue pressure upon the packing 13 during the extension of the shock absorber on account of liquid which has leaked past the obstructor device 38, 39 during the preceding contracting stroke or strokes.

Figure 3:
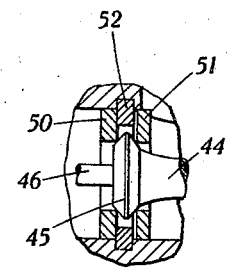

The damping valve device 23, which is operatively interposed between the passage 22 and the interior 24 of the stem 25, comprises an outer shell 40, which is fitted into the end plug 11 of the cylinder and is closed by an adjustable cap member 41. In line with the outer shell 40 the plug 11 is bored transversely, as indicated at 42, and accommodates a piston valve member comprising a cylindrical portion 43, a stem 44, a radial flange 45, and a spigot 46, the latter being adapted to slide within a fixed tubular guide 47. The cylindrical portion 43 at the opposite end of the piston valve member slides within the end part 49 of the outer shell 40, a packing ring 48 being provided to prevent leakage of liquid. The radial flange 45 is of pointed profile in order to produce a pair of opposing frusto-conical seating surfaces, the flange 45 being disposed between a pair of annular valve members 50 and 51. These valve members 50 and 51 are in the form of flat washers, which fit snugly but slidably within the bore 42 and which are urged towards an inwardly projecting abutment ring 52 by a pair of coiled compression springs 53 and 54. The abutment ring 52 is slightly less in axial thickness than the distance which separates the valve members 50 and 51 when they are both in engagement with the flange 45, as will be seen in Figure 3. The annular valve members 50 and 51 have the same internal diameter, and this is equal to the outside diameter of the cylindrical portion 43. The latter is in engagement with a washer 55, which is acted upon by a coiled compression spring 56 serving to force the piston valve member 43—46 towards the left with a force which can be regulated by adjusting the cap 41. This movement of the piston valve member is limited by the tubular guide 47, while its travel in the opposite direction is governed by a stop pin 57 adjustably screw-threaded into a sleeve 58 carried within the cap 41. It will be seen that as the aperture in each of the annular valve members 50 and 51 has the same diameter as that of the cylindrical portion 43, the liquid pressure in the space 24 has no effect in forcing the piston valve member 43—46 in either direction, but the liquid pressure within the variable volume space 21 of the cylinder acts upon the adjacent surface of the radial flange 45 and upon the end of the spigot 46 so as to urge the piston valve member towards the right against the force exerted by the spring 56. In practice the spring 56 is regulated so that when the shock absorber is installed and is in equilibrium bearing its normal static load, said spring 56 is just able to overcome the contrary force exerted by the liquid, thus causing the piston valve member to take up the position shown in Figure 1. It will be seen that the flange 45 has parted from the annular valve member 51, leaving the latter in engagement with the abutment ring 52, while the other annular valve member 50 is separated from the abutment ring 52 and is in seating engagement with the flange 45. Thus under these conditions the working space 21 within the cylinder is completely isolated from the plunger space 27, except perhaps for a very slight amount of leakage which might take place past the outside of the annular valve member 50 and which, although not appreciably affecting the damping action of the valve device in operation, would permit the fluid pressures in the various parts of the shock absorber to become substantially equalised when the shock absorber is in a static condition.

In order that the operation of the shock absorber may be clearly understood, it will be supposed that said shock absorber is operatively interposed between the chassis of a vehicle and one of the wheels thereof so as to transmit to said wheel a predetermined gravitational load constituting part of the weight of the vehicle. This load on the shock absorber will be called W and the corresponding intensity of fluid pressure in the shock absorber necessary to support the load W will be regarded as being P.

Figure 2:
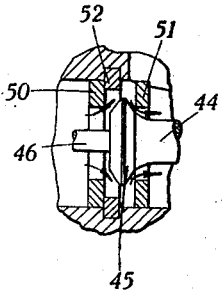
Figures 2 and 3 are fragmentary elevations showing the radial flange of the valve device in two of its operating positions.

When the vehicle is traveling along a smooth surface the shock absorber is under normal static conditions, the load, as mentioned above, being W and the internal fluid pressure being P. When the wheel in question strikes and rides over a bump, the chassis of the vehicle tends to follow its original level course, with the result that the cylinder 10 of the shock absorber rises relative to the plunger 15, thus raising the pressure of the liquid in the cylinder space 21. This causes the piston valve member 43—46 to be deflected swiftly to the right, so that the flange 45 leaves the annular valve member 50 against the abutment ring 52 and deflects the annular valve member 51, the position occupied by the parts being as shown in Figure 2. The liquid can thus escape from the working space 21 by passing between the flange 45 and the annular valve member 50, said liquid then urging the annular valve member 51 away from the flange 45 and consequently gaining free access to the plunger space 27 by way of the passage 24 through the centre of the stem 25. In this way undue rise in pressure within the cylinder space 21 is avoided during the shortening of the shock absorber and only a relatively small upward thrust is imparted to the chassis of the vehicle. When the bump is passed and the recoil or extension stroke of the shock absorber commences, the pressure in the cylinder space 21, of course, ceases to rise, but as the shock absorber is at the time shorter than normal it follows that the pressure within the cylinder space 21 will be somewhat in excess of the normal pressure P. The pressure in the cylinder space 21, however, rapidly falls, but the flow of liquid into said space from the plunger space 27 is prevented by the engagement of the annular valve member 51 with the radial flange 45, as will be seen in Figure 3. This permits the pressure in the cylinder space 21 to fall rapidly until a value approximately equal to P is reached, and at this point the piston valve member 43—46 tends to move back to the position shown in Figure 1, thus allowing the pressure liquid within the stem 25 to force the annular valve member 50 away from the radial flange 45 and pass into the cylinder space 21 at a sufficient rate to maintain the pressure in said space substantially equal to the static value P. This value cannot, of course, be appreciably exceeded during the recoil stroke, for if the liquid were to flow into the cylinder space 21 too fast, the consequent rise in pressure would force the piston valve member 43—46 to the right by overcoming the spring 56, thus effectively preventing any more liquid from flowing into the cylinder space 21 until the pressure therein had dropped below the value P. It will thus be seen that during the recoil stroke of the shock absorber the pressure within the cylinder space is at all stages prevented from rising substantially above the value P, which means that the upward force on the vehicle chassis is limited to a value approximating W; that is, the vehicle is fully supported but is not pushed upwards, except to a very limited extent during the shortening of the shock absorber.

A similar effect occurs when the wheel of the vehicle enters and rides out of a pothole or other depression in the road surface. In this case the shock absorber first extends and the annular valve member 50 permits liquid to enter the cylinder space 21 freely in order that the pressure drop in said space may be as small as possible. As the recoil or shortening stroke commences the liquid is of course trapped within the cylinder space 21, and although the general pressure in the shock absorber is less than P, the pressure rapidly rises in the cylinder space 21 owing to the fact that liquid cannot escape past the annular valve member 50. Very little shortening is therefore necessary to make the pressure in the cylinder space 21 become equal to P, thus enabling the shock absorber once again to support its full static load W. The recoil stroke proceeds, however, and as the pressure liquid in the cylinder space 21 tends to rise above P, the piston valve member 43—46 moves to the right by overcoming the spring 56, thus permitting the liquid to escape at an appropriate rate by shifting the annular valve member 51 away from the flange 45 as the latter leaves the annular valve member 50 in engagement with the abutment ring 52. In this way the liquid within the cylinder space 21 is maintained at a pressure substantially equal to P for the greater part of the recoil stroke, with the result that the weight of the vehicle is efficiently borne by the shock absorber, again without imparting an excessive upward force.

What I claim is:

1. In a hydraulic shock absorber including relatively movable elements defining a variable volume working space therebetween, means defining a variable volume chamber within one of said elements, resilient energy storing means acting on said means and tending to reduce the volume of said variable volume chamber thereby placing the liquid under sufficient pressure to support the normal static load on the shock absorber and means establishing a passageway between said working space and said chamber, a damping valve construction disposed in said passageway, said construction comprising, opposed normally closed check valves and means movable in response to pressure in said working space to open one of said check valves when the pressure in said working space falls below a predetermined value and to open the other of said check valves when the pressure exceeds said value.

2. A shock absorber as claimed in claim 1 including loading means associated with said means movable in response to pressure in the working space, said loading means being so adjusted that liquid is permitted to flow from said working space to said chamber only when the pressure in said working space rises above the pressure corresponding to the static load on the shock absorber and at the same time above the pressure in said chamber.

3. A shock absorber as claimed in claim 1 including loading means associated with said means movable in response to pressure in the working space, said loading means being so adjusted that liquid is permitted to flow from said chamber to said working space only when the pressure in the working space falls below the pressure corresponding to the static load on the shock absorber and at the same time below the pressure in said chamber.

4. A shock absorber as claimed in claim 1 including adjustable spring means for loading the means movable in response to pressure in the working space, the adjustment of said spring means determining the pressure at which said check valves will be opened.

5. In a hydraulic shock absorber including relatively movable elements defining a variable volume working space therebetween, means defining a variable volume chamber within one of said elements, resilient energy storing means acting on said means and tending to reduce the volume of said variable volume chamber thereby placing the liquid under sufficient pressure to support the normal static load on the shock absorber and means establishing a passageway between said working space and said chamber, a damping valve construction disposed in said passageway, said construction comprising, a pair of annular valve members slidable in said passageway to a position permitting liquid flow therethrough, means including a radially extending flange located between said annular members, an annular abutment disposed intermediate said annular valve members serving to space the same, resilient means urging said annular valve members toward one another and against said flange to close said passageway, said flange at one side being exposed to the liquid pressure of said working space and resilient loading means urging said piston against said pressure, whereby one or the other of said annular valve members will be moved to open position depending upon whether the pressure in said working space acting on said flange exceeds or falls below the loading of said resilient means.

6. In a hydraulic shock absorber including relatively movable elements defining a variable volume working space therebetween, means defining a variable volume chamber within one of said elements, resilient energy storing means acting on said means and tending to reduce the volume of said variable volume chamber thereby placing the liquid under sufficient pressure to support the normal static load on the shock absorber and means establishing a passageway between said working space and said chamber, a damping valve construction disposed in said passageway, said construction comprising, means defining a bore communicating with said passageway, a piston valve including a cylindrical portion, a stem and a radial flange, said cylindrical portion being mounted for sliding movement in said bore and said stem extending axially in said passageway, a pair of annular valve members slidable in said passageway to permit fluid flow therethrough, one of said annular valve members being disposed on either side of said radial flange, an annular abutment disposed intermediate said annular valve members serving to space the same, resilient means urging said annular valve members toward one another and against said flange to close said passageway, one side of said flange being exposed to the liquid pressure of said working space and the other side of said flange and the end of said cylindrical portion being exposed to the liquid pressure of said chamber, the diameter of said exposed cylindrical portion being equal to the diameter of the aperture defined by the annular valve members, and a coiled compression spring acting on said cylindrical portion through said stem to urge said radial flange against the pressure of said working space.

7. A shock absorber as claimed in claim 6 including means defining a housing for said coiled compression spring acting on the cylindrical portion of said piston valve, said housing means having a bore therein establishing communication with the surrounding atmosphere, said spring being loaded to overcome the liquid pressure in the shock absorber when the latter is in equilibrium bearing its normal static load.

8. A hydraulic shock absorber comprising, a relatively telescoping piston and cylinder unit, the piston of which is provided with an internal cavity, said piston and cylinder defining a variable volume working space therebetween, a floating piston dividing the internal cavity of said first-named piston into an upper and lower chamber, means establishing a passageway between said working space and said lower chamber, means for admitting a liquid into said lower chamber and said working space, opposed check valves in said passageway, means for admitting air under pressure to said upper chamber and a check valve in said floating piston permitting flow from said lower to said upper chamber, whereby when the shock absorber is being charged with liquid it may pass into the upper chamber and escape through the air admission means.

9. A hydraulic shock absorber comprising, a relatively telescoping piston and cylinder unit, the piston of which is provided with an internal cavity, said piston and cylinder defining a variable volume working space therebetween, a floating piston dividing the internal cavity of said first-named piston into an upper and lower chamber, means establishing a passageway between said working space and said lower chamber, means for admitting liquid into said lower chamber and said working space, opposed check valves in said passageway, means for admitting air under pressure to said upper chamber, said means including a downwardly extending stem disposed axially within said chamber and a check valve in said floating piston permitting flow from said lower to said upper chamber, whereby when the shock absorber is being charged with liquid the liquid may pass into the upper chamber and may escape through the air admission means, while the length of the axially extending stem determines the volume of liquid retained within the shock absorber.

PETER WARBORN THORNHILL.